Figure 1:
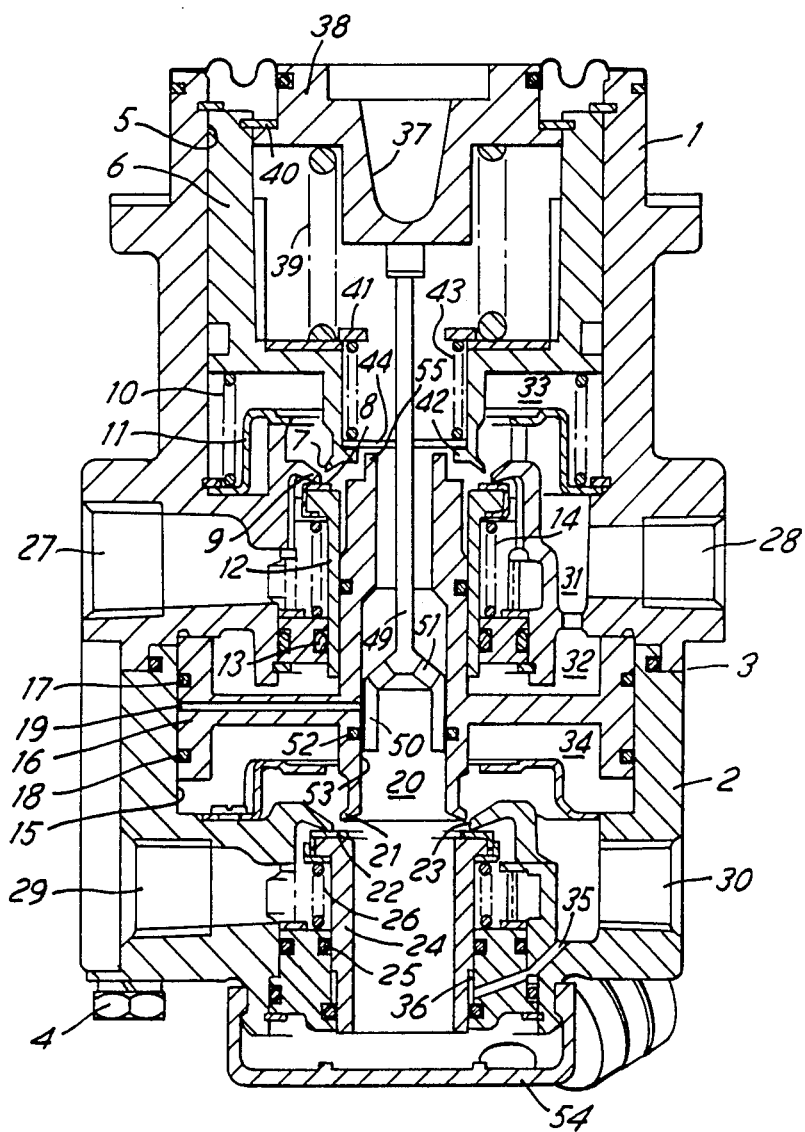

United States Patent [19]

Fogg

[11] Patent Number: 4,679,594
[45] Date of Patent: Jul. 14, 1987

[54] TWO-CIRCUIT FLUID PRESSURE CONTROL VALVE

[75] Inventor: Stephen W. Fogg, Bath, England
[73] Assignee: Bendix Limited, Bristol
[21] Appl. No.: 834,684
[22] Filed: Feb. 28, 1986
[30] Foreign Application Priority Data Mar. 21, 1985 [GB] United Kingdom ............... 8507330

[51] Int. Cl.[4] ............................................. B60T 15/02
[52] U.S. Cl. .................................... 137/627.5; 303/52
[58] Field of Search ....................... 137/627.5; 303/52

[56] References Cited

U.S. PATENT DOCUMENTS

| 3,265,447 | 8/1966 | Bueler | 303/52 |
| 3,355,223 | 11/1967 | Klimek | 303/52 |
| 3,359,043 | 12/1967 | Papin | 137/627.5 X |

FOREIGN PATENT DOCUMENTS 2128280  4/1984  United Kingdom ................. 303/52

Primary Examiner—Robert G. Nilson
Attorney, Agent, or Firm—Ken C. Decker; William N. Antonis

[57] ABSTRACT

A dual circuit foot valve for a compressed air braking system has a plunger (38) which acts through a spring (39) on a first piston (6) which carries an exhaust seat for a first double valve controlling the supply of pressure from an input port (27) to a first circuit delivery port (28), the delivered pressure at (28) acting beneath the piston (6) in a sense to cause lapping of the valve and also acting above a second piston (16) which similarly acts as a control piston for a further double valve controlling the supply of pressure from an input port (29) to a second circuit delivery port (30), a further spring 43 being carried within the piston 6 to be engageable with a projection (55) of the second piston (16) following operation of the plunger to act on the second piston to beneficially influence the differential between the two delivered pressures.

4 Claims, 2 Drawing Figures

TWO-CIRCUIT FLUID PRESSURE CONTROL VALVE

This invention relates to a two-circuit fluid pressure control valve.

Two-circuit fluid pressure control valves are used in heavy road vehicles for controlling compressed air control pressures to independent braking circuits of compressed air braking systems or air-over-hydraulic braking systems. Typical such dual circuit valves comprise a first self-lapping air pressure control valve the output pressure of which not only controls a first fluid pressure output port but alos is applied to a relay piston of a second self-lapping fluid pressure control valve to provide an output pressure to a second fluid pressure output port. Such a dual circuit valve invariably presents a pressure differential between the control pressures at the respective output ports. Such differential is due at least in part to hysteresis resulting from resistance to movement presented by seals, principally piston seals.

The object of the present invention is to provide a two circuit fluid pressure control valve wherein such differential effects are at least partially compensated for.

According to the present invention there is provided a two-circuit fluid pressure control valve having a housing containing an input member acting via resilient coupling means upon a first fluid pressure responsive member a first double valve operable dependent upon the position of said first pressure responsive member to alternatively connect a first output port to an input port or to a vent the pressure at said first output port acting on said first pressure responsive member in a sense to oppose the action of the resilient coupling means and also acting on a second pressure responsive member a second double valve operable dependent upon the position of said second pressure responsive member to alternatively connect a second output port to an input port or to a vent the pressure responsive member being subject to pressure at the second output port in a sense to oppose the action thereon of the pressure at the first output port and a reaction linkage acting between said input member and the second pressure responsive member for reducing hysteresis thereof in the housing.

Figure 2:
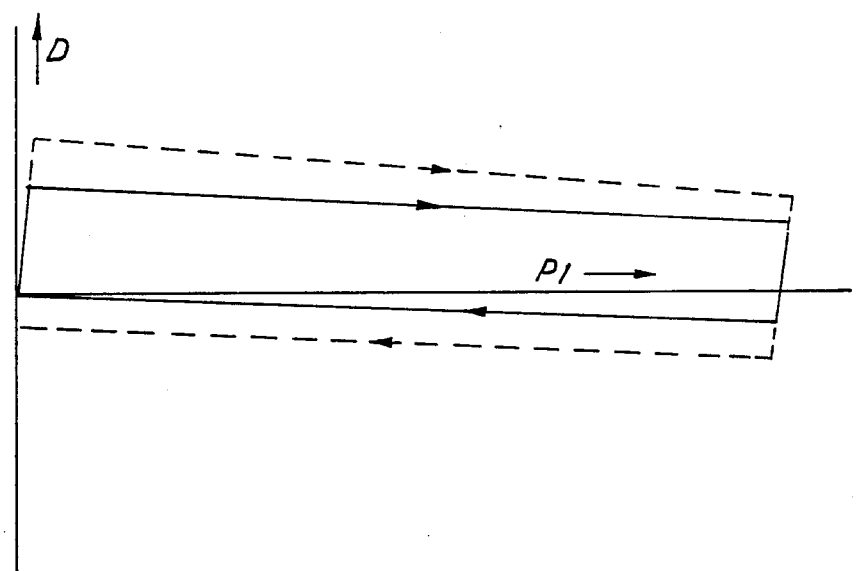

In order that the present invention may be clearly understood and readily carried into effect, the same will be further described by way of example with reference to the accompanying drawings of which, FIG. 1 illustrates in diagrammatic sectional form a dual air pressure control valve for a multi-circuit fluid pressure operable braking system and, FIG. 2 illustrates typical graphs of differential as between first and second braking circuits controlled by a valve such as shown in FIG. 1. Referring to FIG. 1, the dual fluid pressure control valve shown therein is intended to be suitable for use as a foot operable control valve for controlling independent compressed air operable service brake circuits of a heavy road vehicle. The assembly comprises first and second housing parts 1 and 2 bolted together with a seal at 3 by means of suitably located bolts such as 4. Sealingly slideable within a cylindrical bore 5 of the uppermost part 1, there is a first pressure responsive member 6 carrying an exhaust valve seat 7 of a self-lapping double valve having a valve member 8 and an inlet valve seat 9 formed in the housing. The pressure responsive member 6 is upwardly urged by means of a spring 10 captive between 5 and the housing with a baffle 11. The valve member 8 is carried on a tubular element 12 which itself is sealingly slideable through a seal member 13 retained in the housing and is urged by a light spring 14 towards the position as shown wherein 8 is in engagement with seat 9.

Sealingly slideable within the lower part 2 of the housing in a cylindrical bore 15 thereof there is a further pressure responsive member in the form of a piston 16 provided with seals 17 and 18 the space between which is vented via a small passage 19 into the central vented region 20 of the assembly. The piston 16 has a downward projection carrying an exhaust valve seat 21 of a further double valve with a valve member 22 and an inlet valve seat 23 formed in the housing. The valve member 22 is carriedon a tubular element 24 slideable in the housing through a seal member 25 retained in the housing and 24 is upwardly urged by a light spring 26 towards engagement with inlet seat 23.

The first double valve comprising valve member 8 and seats 7 and 9 is arranged to receive fluid pressure from an input port 27 and dependent upon operation of the valve to deliver an output pressure at a first output port 28. This pressure is also communicated via a passage 31 to the region 32 above piston 16 and is effective in the region 33 under the piston 6. The second double valve comprising valve member 22 and valve seats 21 and 23 is arranged to receive input pressure at a port 29 and to deliver output pressure at a second output port 30. This pressure is also effective in the region 34 under the piston 16 and via a passage 35 under a balancing area 35 of the valve element 24.

The whole assembly is operated by a driver's foot pedal, now shown, but which is engageable with a socket 37 formed in an input member in the form of a plunger 38 which is slideable within the piston 6. The plunger 38 is upwardly urged towards an internal circlip 40 in piston 6 by a spring 39 captive beneath the piston 6. The lower end of the spring 39 rests against a washer 41 between which and a shoulder 42 of piston 6 a spring 43 and a washer 44 are retained. The washer 44 is engageable by an upward projection 55 carried on a central portion of the piston 16 which is sealingly slideable in element 12.

Extending downward from the centre of the plunger 38 and connected thereto is a rod 49 of a frictional reaction link with a widened lower end part 50 having through-passages 51 and being slideable within a tightly fitting 'O' ring 52 retained in the central bore 53 of the lower pressure responsive member 16. As seen the rod 49 passes with good venting clearance through the centre of the assembly and is freely moveable therein subject to the intentional frictional engagement with the 'O' ring 52. The lower end of the assembly is covered by a suitable vent cap 54.

In operation of the dual foot valve shown in FIG. 1, respective fluid pressure reservoirs are connected at first and second input ports 27 and 29 and discreet service brake circuits for a vehicle are connected at first and second output ports 28 and 30 respectively. In the postion shown the driver's foot pedal is unoperated and the plunger 38 is in its uppermost position as determined by the action of the springs 10 and 39. In this position the output ports 28 and 30 are vented via the respective open exhaust valve seats 7 and 21 to the central vented region 20. Upon operation of the driver's foot pedal the plunger 38 is moved downwards initially carrying the piston 6 with it by virtue of spring 39 such as to cause engagement between washer 44 and the upper end of extension 55, tending to urge the relay piston 16 downwards. More or less simultaneous engagement then takes place with the respective exhaust valve seats of the double valve members 8 and 22 of the first and second double valves followed by the generation of some output pressure at the port 28 and transmission thereof via passage 31 to the region 32 above piston 16. This causes unseating of the inlet valve from seat 23 resulting in corresponding elevation of output pressure at port 30. The build-up of pressure at the first output port 28 is communicated to the region 33 under the first pressure responsive member 36 which is thereby deflected upwards towards the displaced plunger 38 against the action of spring 39 and the first double valve is able to adopt a lapped position in known manner. Similarly, the build-up of pressure at the second output port 30 is communicated to the region 34 beneath the piston 16 causing upward movement thereof against the action of spring 43 and enabling the second double valve member 21 to adopt a lapped position which seats 21 and 23. In such lapped positions the respective valve elements engaged with their inlet and exhaust valve seats in each case.

Further downward movement of the plunger 38 will result in enhanced pressure at output ports 28 and 30 accompanied by increased compression of spring 39 and uncreased foot pedal reaction. Upward movement of the plunger 38 will result in the pressure in region 33 urging piston 6 upwards with resultant partial venting thereof together with the pressure in region 32. The relay piston 16 is thus also unbalanced resulting in partial venting of the output pressure at output 30. As mentioned above, owing to frictional effects of the seals 17 and 18 of the relay piston 15, there is appreciable hysteresis associated with this pressure responsive member which could result in an undesirable differential between the output pressures at the first and second output ports 28 and 30. Such differential is notable for the manner in which it changes depending upon whether one is considering air increasing or decreasing pressure displacement characteristic for the assembly. By virtue of the reaction linkage in accordance with the invention including the widened portion 50 carried by the rod 49 and connected to the plunger 38, an added force is applied to the relay piston 16 up to the value of limiting friction at 'O' ring 52 and such added force acts in a sense to oppose and at least partially compensate for frictional resistance presented by seals 17 and 18 in the bore 15.

Referring to FIG. 2 this shows graphically a solid line curve of typical output pressure P1 at port 28 for increasing and decreasing plunger displacements or pedal forces, against pressure differential D between the resultant pressure outputs at ports 28 and 30. For comparison the broken line curve is a typical such curve for this differential in circumstances where the frictional link including reaction means 49, 50 51, 52 is assumed not to be present. This, therefore, illustrates the typically reduced differential which may be achieved by providing a reaction linkage such as described. A spring such as 43 which is normally a spring not affecting the balance of the systems of forces (since it is contained between a shoulder 42 and a member 41) only comes into operation following engagement with the upper end 55 of the relay piston 16. The force of the spring 43 is chosen to approximate to half the load presented to the seat 21 of the piston 16 by the second double valve element 24. It thus ensures prompt engagement of the exhaust valve seat 21, following downward movement of 38, by urging the piston 16 downwards. This assists the frictional action of part 50 in relation to piston 16 in a sense to favour the pressure at 30 in relation to that at 38 throughout the control range. Although not essential to the present invention, it is, therefore, seen that spring 43 assists in reducing the pressure differential between the rising delivered pressures at ports 28 and 30.

I claim:

1. A two-circuit fluid pressure control valve having a housing containing an input member acting via resilient coupling means upon a first fluid pressure responsive member, a first double valve operable dependent upon the position of said first pressure responsive member to alternatively connect a first output port to an input port or to a vent, the pressure at said first output port acting on said first pressure responsive member in a sense to oppose the action of the resilient coupling means and also acting on a second pressure responsive member, a second double valve operable dependent upon the position of said second pressure responsive member to alternatively connect a second output port to an input port or to a vent, the pressure responsive member being subject to pressure at the second output port in a sense to oppose the action thereon of the pressure at the first output port and a reaction linkage interconnecting said input menber and the second pressure responsive member for reducing hysteresis thereof in the housing, said reaction linkage being movable by said input member relative to and independent of the movement of both said first fluid pressure responsive means and said first double valve.

2. A two-circuit fluid pressure control valve as claimed in claim 1, wherein the reaction linkage acting between the input member and the second pressure responsive member comprises a frictional element carried by one of these members and slidingly engaging the other of these members.

3. A two-circuit fluid pressure control valve as claimed in claim 1, the reaction linkage comprising a rod passing through the first valve having one end attached to the input member and having at the other end a widened portion adapted to frictionally interact with a central tubular bore of the second pressure responsive member.

4. A two-circuit fluid pressure control valve as claimed in claim 3, said interaction being provided through an 'O' ring located in a groove in said bore.

* * * * *